US009756639B2

(12) United States Patent
Sebire

(10) Patent No.: US 9,756,639 B2
(45) Date of Patent: Sep. 5, 2017

(54) METHOD, APPARATUSES AND COMPUTER PROGRAM FOR REPORTING IN-DEVICE COEXISTENCE INFORMATION

(71) Applicant: Nokia Solutions and Networks Oy, Espoo (FI)

(72) Inventor: Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 114 days.

(21) Appl. No.: 14/670,665

(22) PCT Filed: Sep. 28, 2012

(86) PCT No.: PCT/EP2012/069249
§ 371 (c)(1),
(2) Date: Mar. 27, 2015

(87) PCT Pub. No.: WO2014/048498
PCT Pub. Date: Apr. 3, 2014

(65) Prior Publication Data
US 2015/0305039 A1    Oct. 22, 2015

(51) Int. Cl.
*H04W 72/04*    (2009.01)
*H04L 5/00*    (2006.01)
*H04W 72/12*    (2009.01)

(52) U.S. Cl.
CPC ......... *H04W 72/0453* (2013.01); *H04L 5/001* (2013.01); *H04L 5/0032* (2013.01);
(Continued)

(58) Field of Classification Search
CPC ........................ H04W 72/0453; H04L 5/001
See application file for complete search history.

(56) References Cited

U.S. PATENT DOCUMENTS 6,889,050 B1 *  5/2005  Willars ............... H04L 47/10
                                                         370/329
9,241,336 B2 *  1/2016  Yoshizawa ......... H04K 3/226
(Continued)

FOREIGN PATENT DOCUMENTS

WO    WO 2012/108711 A2    8/2012
WO    WO 2012/124918 A2    9/2012
WO    WO 2012/136263 A1    10/2012

OTHER PUBLICATIONS

3GPP TR 36.816 V11.2.0 (Dec. 2011), "$3^{rd}$ Generation Partnership Project; Technical Specification Group Radio Access Network; Evolved Universal Terrestrial Radio Access (E-UTRA); Study on signaling and procedure for interference avoidance for in-device coexistence (Release 11)", 44 pgs.
(Continued)

*Primary Examiner* — Parth Patel
(74) *Attorney, Agent, or Firm* — Harrington & Smith

(57) ABSTRACT

Methods and apparatus for control of a device with coexisting radios and capable of carrier aggregation are disclosed. A change in the activation status of a secondary cell can be determined where after interference information to be reported is determined in response to the determined change. The determined interference information is compared to interference information reported previously for a similar change, and a decision is made based thereon whether to send the determined interference information. In a network entity interference information received from at least one device is stored. The stored interference information is used in the control when it is determined that no interference information is received subsequent to a new change in the activation status of the secondary cell.

15 Claims, 4 Drawing Sheets

(52) U.S. Cl.
CPC .......... *H04L 5/0094* (2013.01); *H04L 5/0098* (2013.01); *H04W 72/1215* (2013.01)

(56) References Cited

U.S. PATENT DOCUMENTS

| | | | | |
|---|---|---|---|---|
| 2002/0107021 A1* | 8/2002 | Ishikawa | ............. | H04W 52/343 455/436 |
| 2005/0090244 A1* | 4/2005 | Ammi | ................... | H04W 16/18 455/423 |
| 2007/0060178 A1* | 3/2007 | Gorokhov | ............... | H04L 5/006 455/506 |
| 2007/0207770 A1* | 9/2007 | Ikaheimo | .............. | H04W 24/08 455/403 |
| 2007/0264963 A1* | 11/2007 | Srinivasan | ........ | H04W 52/0245 455/343.2 |
| 2007/0280332 A1* | 12/2007 | Srikanteswara | ......... | H04B 1/10 375/130 |
| 2009/0161619 A1* | 6/2009 | Noma | ................. | H04W 72/082 370/329 |
| 2009/0170497 A1* | 7/2009 | Miao | ................... | H04W 72/082 455/422.1 |
| 2009/0270109 A1* | 10/2009 | Wang Helmersson | ........ | H04W 52/367 455/453 |
| 2011/0134774 A1* | 6/2011 | Pelletier | .............. | H04W 52/365 370/252 |
| 2012/0040676 A1* | 2/2012 | Jang | ...................... | H04W 36/30 455/436 |
| 2012/0069766 A1* | 3/2012 | Fu | ......................... | H04B 1/406 370/252 |
| 2012/0087341 A1* | 4/2012 | Jang | .................. | H04W 72/1215 370/331 |
| 2012/0213095 A1* | 8/2012 | Krishnamurthy | ....... | H04L 5/001 370/252 |
| 2012/0220228 A1* | 8/2012 | Tandai | .................. | H04W 72/02 455/41.1 |
| 2012/0252437 A1* | 10/2012 | Garcia | ................. | H04J 11/0056 455/423 |
| 2012/0276936 A1* | 11/2012 | Ahn | .................... | H04W 76/028 455/501 |
| 2013/0053039 A1* | 2/2013 | Jorguseski | ............ | H04W 24/02 455/436 |
| 2013/0095829 A1* | 4/2013 | Bhattad | ................ | H04B 1/7107 455/434 |
| 2013/0242860 A1* | 9/2013 | Kim | ...................... | H04W 36/20 370/328 |
| 2013/0250882 A1* | 9/2013 | Dinan | ............... | H04W 72/0426 370/329 |
| 2013/0288742 A1* | 10/2013 | Yao | ...................... | H04J 11/0023 455/553.1 |
| 2013/0324172 A1* | 12/2013 | Ahn | .................. | H04W 36/0094 455/501 |
| 2013/0343288 A1* | 12/2013 | Ratasuk | ............ | H04W 72/1215 370/329 |
| 2014/0022972 A1* | 1/2014 | Ahn | .................. | H04W 36/0072 370/311 |
| 2014/0044000 A1* | 2/2014 | Charbit | ................. | H04W 24/08 370/252 |
| 2014/0341193 A1* | 11/2014 | Lee | ....................... | H04W 24/10 370/336 |
| 2015/0148050 A1* | 5/2015 | Siomina | ................. | H04J 11/005 455/452.1 |
| 2015/0230286 A1* | 8/2015 | Feuersaenger | .... | H04W 72/1215 370/252 |

OTHER PUBLICATIONS

3GPP TS 36.300 V11.3.0 (Sep. 2012), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 205 pgs.

3GPP TS 36.331 V11.1.0 (Sep. 2012), "3$^{rd}$ Generation Partnership Project; Technical Specification Group Radio Access Network; Evolved Universal Terrestrial Radio Access (E-UTRA); Radio Resource Control (RRC); Protocol specification (Release 11)", 325 pgs.

3GPP TSG-RAN WG2 #77bis, Jeju, South Korea, Mar. 26-30, 2012, Tdoc R2-121645, "Measurements and triggers for IDC Indication", Ericsson, ST-Ericsson, 3 pgs.

3GPP TSG-RAN2 Meeting #78, Prague, Czech, May 21-25, 2012, R2-122858, "IDS considering CA", LG Electronics Inc., 2 pgs.

3GPP TSG-RAN WG2 Meeting #79bis, Bratislava, Slovakia, Oct. 8-12, 2012, R2-124424, "IDC and Carrier Aggregation", Nokia Siemens Networks, Nokia Corporation, 2 pgs.

3GPP TSG-RAN2#81 meeting, St. Julian's, Malta, Jan. 28-Feb. 1, 2013, R2-130140, "Clarifications on Three Phases in IDC" ZTE Corporation, 2 pgs.

* cited by examiner

METHOD, APPARATUSES AND COMPUTER PROGRAM FOR REPORTING IN-DEVICE COEXISTENCE INFORMATION

This disclosure relates to reporting in a wireless communication system and more particularly to reporting of information in relation to a wireless device provided with coexisting radios.

A communication system provides a facility that enables communication sessions between two or more entities such as fixed or mobile communication devices, base stations, servers, machine type devices, and/or other communication nodes. A communication system and compatible communicating entities typically operate in accordance with a given standard and/or specification setting out how the various entities shall operate. In a wireless communication system at least a part of the communication between at least two devices, or stations occurs over a wireless interface. Examples of wireless systems include public land mobile networks (PLMN) such as cellular networks, satellite based communication systems and different wireless local networks, for example wireless local area networks (WLAN). A wireless connection can also be provided by short range radio, for example based on the Bluetooth™ radio.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications can be provided between appropriate communication devices. In a wireless system a communication device can provide a transceiver station that can communicate with another communication device such as e.g. base stations of access networks and/or other user equipment. A communication device of a user is often referred to as user equipment (UE) or terminal. A communication device is provided with an appropriate signal receiving and transmitting arrangement for enabling communication of data and signalling with other parties. For example, access to a communication network or communications directly with other users can be provided. The communication device may access a carrier provided by a station, for example a base station providing art least one cell, and transmit and/or receive communications on the carrier. Carrier aggregation can be used to increase performance. In carrier aggregation a plurality of carriers are aggregated to increase bandwidth. Carrier aggregation comprises aggregating a plurality of component carriers into a carrier that is referred to in this specification as an aggregated carrier. For example, LTE-Advanced is capable of providing carrier aggregation. In LTE-A two or more component carriers (CCs) can be aggregated in order to support wider transmission bandwidths and/or for spectrum aggregation. Depending on its capabilities, it is possible to configure a user equipment (UE) to aggregate a different number of component carriers, either originating from the same location or from different ones, and/or either from the same frequency band or different ones. A primary component carrier can be provided by a primary cell (PCell) whereas further carriers can be provided by at least one secondary cell (SCell). SCells form together with the PCell a set of serving cells. To enable reasonable battery consumption by the user equipment when aggregating carriers, an activation/deactivation mechanism of SCells is supported. When an SCell is deactivated, it is not necessary for the user equipment to receive the corresponding physical downlink control channel (PDCCH) or physical downlink shared channel (PDSCH). Also, in this state the user equipment cannot transmit in the corresponding uplink and nor is it required for it to perform channel quality indicator (CQI) measurements. Conversely, when an SCell is active, the user equipment shall receive PDSCH and PDCCH (if the user equipment is configured to monitor PDCCH from this SCell), and is expected to be able to perform CQI measurements.

A communication device can be provided with a multiple of coexisting radios in order to allow users to access various networks and services ubiquitously. For example, a wireless communication device can be equipped with multiple radio transceivers. The number of such devices is increasing. In accordance with a more particular example a mobile device may be equipped with a cellular radio (e.g. LTE), a wireless local area network (e.g. WiFi™), and a short range radio (e.g. Bluetooth™) transceivers, and global navigation satellite system (GNSS) receivers. This can cause problems in view of interference, and more particularly, coexistence interference between the collocated radio transceivers. In-device coexistence (IDC) interference can occur for example when transmitting in one frequency band interferes with receiving in another band within the same equipment. For example, due to the proximity of multiple radio transceivers, the transmit power of one transmitter may be much higher than the received power level of another receiver. By means of filter technologies and sufficient frequency separation, the transmit signal may not result in significant interference. But for some coexistence scenarios, e.g. different radio technologies within the same device operating on adjacent frequencies, current state-of-the-art filter technology might not provide sufficient rejection. Therefore, solving the interference problem by a single generic radio frequency (RF) design may not always be possible and alternative methods may need to be considered.

A base station serving a mobile device can be used to mitigate the effect of coexistence interference. One of the proposals for avoidance of in-device coexistence interference in relation to the LTE is for the user equipment to signal information to the radio access network based on which a controller associated with the base station can made decision such as when transmission/reception or other radio signal would benefit or no longer benefit from not using certain carriers or frequency resources. A more particular example is known as a Frequency Domain Multiplexing (FDM) Solution. In accordance with this solution an Industrial, Scientific and Medical (ISM) radio signal is led away from LTE frequency band in frequency domain. The arrangement may also need to avoid coexistence interference to ISM radio during an initial stage to help the ISM radio to complete the necessary procedure to enable this option. Another example for avoidance of in-device coexistence interference is known as a time domain multiplexing (TDM) solution. In the TDM scheduled and unscheduled periods are alternated on the problematic frequencies to ensure that transmission of a signal does not coincide with reception of another signal. To provide control based on e.g. FDM and/or TDM principles, the access system relies on information signalled from the user equipment to the network element, which in LTE would be evolved NodeB (eNB). Based on such information, final TDM patterns (i.e. scheduled and unscheduled periods) relying on DRX can be configured by the eNB. For the FDM solution, the user equipment can indicate which frequencies are unusable due to in-device coexistence. In response to such signalling, an eNB can then take appropriate action, for example order a handover to a frequency that has not been reported as suffering from in-device coexistence interference In the following description, the information reported by the user equipment to assist the access system in solutions such as the FDM and TDM will be referred to as in-device coexistence (IDC) information. In the standards this information can be referred to as InDeviceCoexIndication.

When features such as carrier aggregation (CA) is combined with IDC information reporting, situations where the content of IDC information changes can occur relatively frequently, depending on the changes in the activation activation status of a secondary cell (SCell) and as a result, whenever the activation status of an SCell changes, the user equipment always needs to report new IDC information to the network.

Embodiments of the invention aim to address one or several of the above issues.

It is noted that the issues are not limited to any particular communication system, standard, specification, radios and so forth, but may occur in any communication device and/or system where a device can be provided with coexisting radios.

In accordance with an embodiment there is provided a method for a device with coexisting radios and capable of carrier aggregation, comprising determining a change in the activation status of a secondary cell, determining interference information to be reported in response to the determined change in the activation status of the secondary cell, comparing the determined interference information to be reported to interference information reported previously for a similar change in the activation status of the secondary cell, and deciding whether to send the determined interference information based on the comparison.

In accordance with an embodiment there is provided a method for a network entity for control of at least one device with coexisting radios and capable of carrier aggregation, comprising storing interference information received from the at least one device in response to a changed activation status of a secondary cell, determining a new change in the activation status of the secondary cell, determining whether interference information is reported in response to the new change in the activation status of the secondary cell, and using the stored interference information in the control when it is determined that no interference information is received subsequent to the new change in the activation status of the secondary cell.

In accordance with an embodiment there is provided a method for a device with coexisting radios and capable of carrier aggregation, comprising determining interference information assuming a given activation status for at least one secondary cell in a configured set of cells, and reporting the determined interference information to a network for use in controlling the device. The given change may be assumed for all secondary cells in the configured set.

In accordance with an embodiment there is provided an apparatus for controlling a device with coexisting radios and capable of carrier aggregation, the apparatus comprising at least one processor, and at least one memory including computer program code, wherein the at least one memory and the computer program code are configured, with the at least one processor, to determine a change in the activation status of a secondary cell, determine interference information to be reported in response to the determined change in the activation status of the secondary cell, compare the determined interference information to be reported to interference information reported previously for a similar change in the activation status of the secondary cell, and decide whether to send the determined interference information based on the comparison.

In accordance with an embodiment there is provided an apparatus for a network entity for control of at least one device with coexisting radios and capable of carrier aggregation, the apparatus comprising at least one processor, and at least one memory including computer program code, wherein the at least one memory and the computer program code are configured, with the at least one processor, to store interference information received from the at least one device in response to a change in the activation status of a secondary cell, determine a new change in the activation status of the secondary cell, determine whether interference information is reported in response to the new change in the activation status of the secondary cell, and use the stored interference information in the control when it is determined that no interference information is received subsequent to the new change in the activation status of the secondary cell.

In accordance with an embodiment there is provided an apparatus for a device with coexisting radios and capable of carrier aggregation, the apparatus comprising at least one processor, and at least one memory including computer program code, wherein the at least one memory and the computer program code are configured, with the at least one processor, to determine interference information assuming a given activation status for at least one secondary cell on a configured set of cells, and report the determined interference information to a network for use in controlling the device.

In accordance with an aspect the interference information comprises in-device coexistence interference information. The change in activation status may comprise activation or deactivation of the secondary cell. Interference information may be reported in response to the change in the activation status only when there is different information content to be reported compared to previous reporting for similar change.

A base station such as an eNB or a user equipment implementing the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 to 4 to assist in understanding the technology underlying the described examples.

Figure 1:
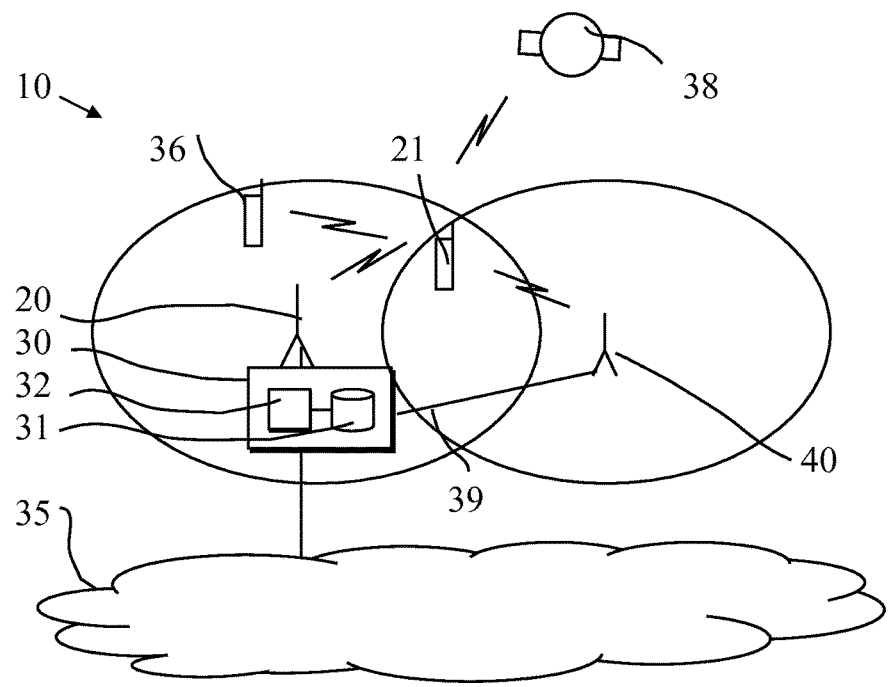
FIG. 1 shows an example of a communication system wherein below described examples of the invention may be implemented.

A mobile communication device 21 is typically provided wireless access via at least one access node such as a base station, a remote radio head or similar wireless transceiver node. In FIG. 1 base station 20 and remote radio head 40 provide each a radio service area or a cell of a cellular system. The cell borders are shown schematically by the oval shaped patterns, and only for illustration purposes. It is also noted that a great number of radio service areas may be provided in a communication system and that a mobile communication device may simultaneously be located in a plurality of cellular service areas. Also, the transceiver node sites 20 and 40 can each provide more than one cell and/or a plurality of sectors, for example three radio sectors, each sector providing a cell or a sub radio service area of a cell. For the purposes of the examples described herein, the cell provided by base station 20 can be seen as a primary cell (PCell) and the cell provided by the remote radio head 40 as a secondary cell (SCell). The example shown uses the remote radio head for the secondary cell for clarity, and it is noted that a secondary cell can also be provided by other stations, for example by the same base station 20 providing the primary cell.

A transceiver node is typically controlled by at least one appropriate controller so as to enable operation thereof and management of mobile communication devices in communication with the station. The control apparatus can be interconnected with other control entities. In FIG. 1 a control apparatus of base station 20 is shown schematically as being provided by block 30. A suitable control apparatus can be provided with memory capacity 31 and at least one data processor 32. The control apparatus and functions may be distributed between a plurality of control units.

A non-limiting example of communication systems is the long-term evolution (LTE) of the Universal Mobile Telecommunications System (UMTS) that is standardized by the 3rd Generation Partnership Project (3GPP). A LTE base station is known as evolved or enhanced NodeB (eNB) in the vocabulary of the 3GPP specifications. LTE based systems can employ a mobile architecture known as the Evolved Universal Terrestrial Radio Access Network (E-UTRAN). Other examples of radio services providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

In FIG. 1 example stations 20 and 40 are connected to a wider communications network 35. A controller may be provided for coordinating the operation of the access systems. A gateway function may also be provided to connect to another network via the network 35. The other network may be any appropriate network. A wider communication system may thus be provided by one or more interconnect networks and the elements thereof, and one or more gateways may be provided for interconnecting various networks. Stations 20 and 40 are connected for signalling purposes, as indicated by the connection 39. The connection between the base stations may involve intermediate nodes of one or more cellular networks.

The mobile communication device 21 may further communicate with for example another mobile device 36. This communication may be provided by means of a short range link, for example, by means of Bluetooth™ connectivity. FIG. 1 also shows a satellite 38 with which the mobile device 21 may receive and/or receive and transmit radio signals. The satellite may be a satellite of a positioning system or a satellite of a satellite based communication system.

Figure 2:
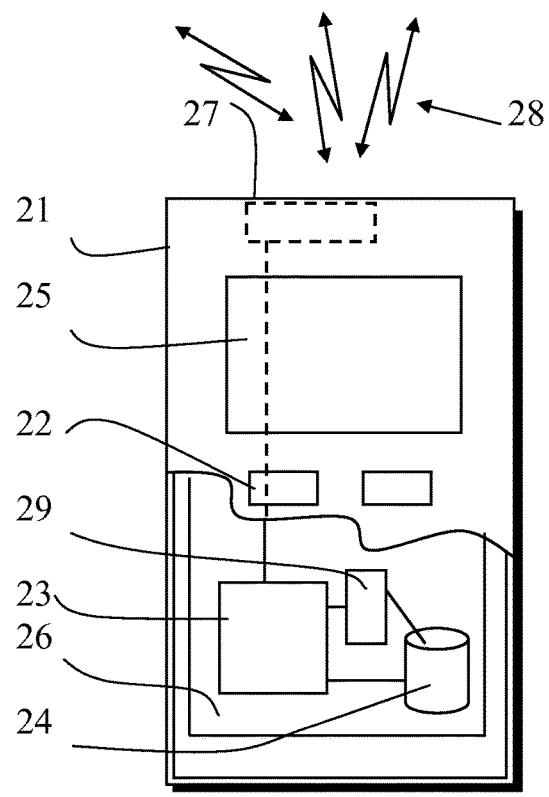
FIG. 2 shows an example of a communication device.

FIG. 2 shows a schematic, partially sectioned view of a communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with stations of the network and other communication devices. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system. A more detailed example of possible radio components is shown in FIG. 3.

In order to allow users to access various communication systems and services ubiquitously, a user equipment can be equipped with multiple coexisting radio transceivers. However, this can cause interference, and more particularly, coexistence interference between those collocated radio transceivers. In-device coexistence interference can occur for example when transmitting in one frequency band interferes with receiving in another, within the same user equipment. FIG. 3 shows an example of coexistence interference in a multi-radio device. Due to the proximity of multiple radio transceivers within the same device, the transmit power of one transmitter may be much higher than the received power level of another receiver, and this can cause interference.

Figure 3:
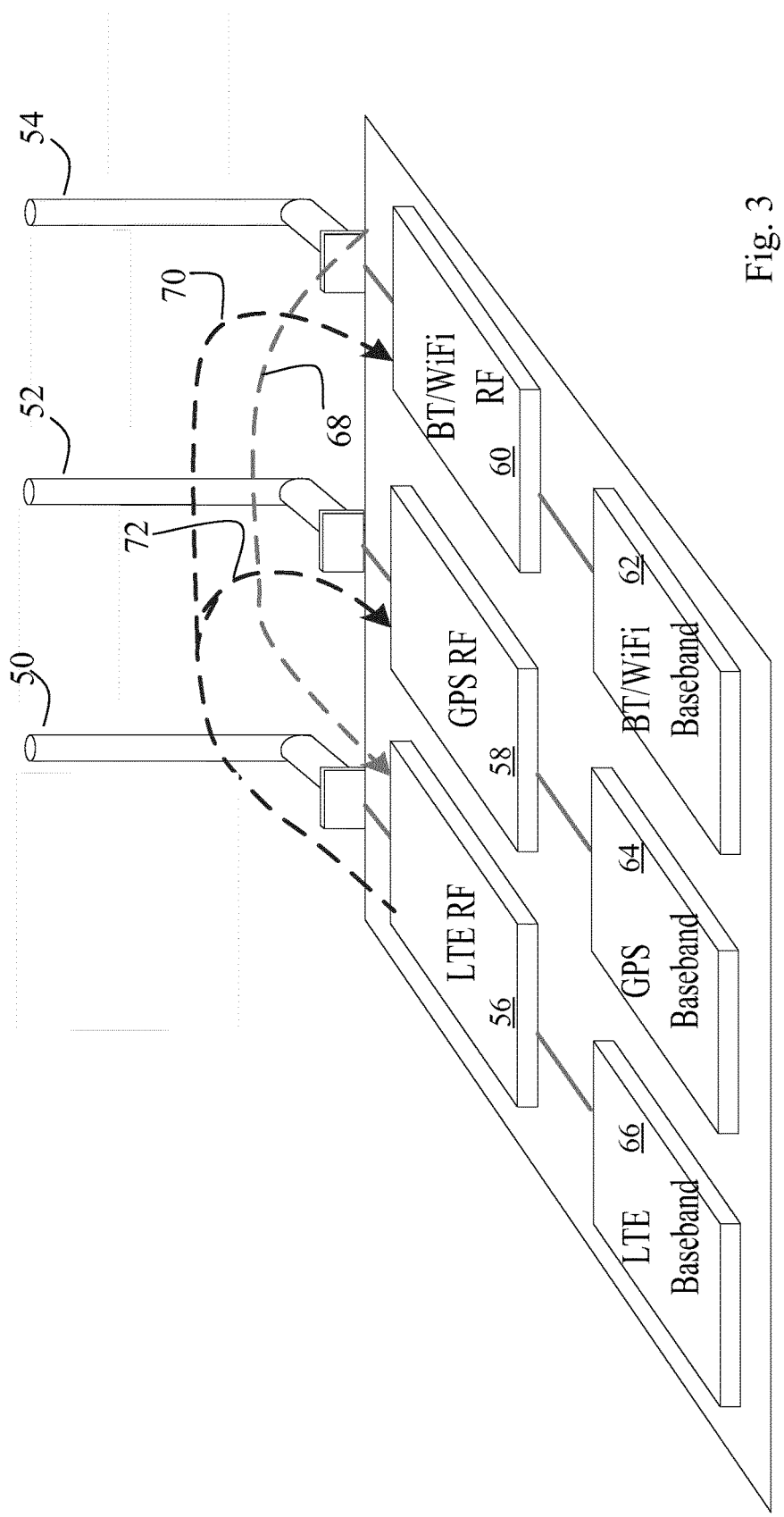
FIG. 3 shows an example of a multi-radio communication device.

In the example of FIG. 3, a device 21 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth™ and/or Wi-Fi™' signals. The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth™/Wi-Fi™ radio frequency processor 60 which in turn is connected to the Bluetooth™/Wi-Fi™ baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing. In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas. It should be appreciated that in some embodiments, the GPS blocks may only need to receive signals.

It is possible that when LTE and Industrial, Scientific and Medical (ISM; this can include technologies such as the Bluetooth™ and WLAN) radio capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. This interference between the different frequencies is schematically shown in FIG. 3 by arrowed dashed lines 68 and 70. This interference can be addressed by e.g. the FDM and TDM techniques discussed above.

Figure 4:
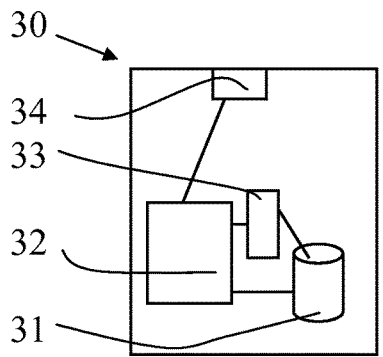
FIG. 4 shows an example of controller apparatus for a base station.

FIG. 4 shows an example of a control apparatus 30, for example to be coupled to and/or for controlling a station of a radio service area, for example one of the stations 20 and 40 of FIG. 1. The control apparatus 30 can be arranged to process and/or control signalling and other communications by mobile communication devices in a service area of a station. The control apparatus 30 can be configured to provide control functions in association with communication, storage and use of IDC information. The control apparatus can control operation of mobile devices within its service area based on information communicated in accordance with certain embodiments described below, for example for disabling one or more of the radios and/or using a different configuration pattern during a handover. For providing the control the control apparatus 30 can comprise at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

As explained above, to provide control based on e.g. FDM and/or TDM principles, the access system relies on IDC information signalled from the mobile devices to the network entity, for example eNB. For the TDM solution, the IDC information can comprise e.g. information elements such as drx-CycleLength, drx-Offset and drx-ActiveTime. Based on such IDC information, final TDM patterns (i.e. scheduled and unscheduled periods) relying on discontinuous reception (DRX) can be configured by the eNB. For the FDM solution, the mobile devices can indicate which frequencies are unusable due to in-device coexistence. For example, affectedCarrierFregList and interferenceDirection elements can be sent. In response to such signalling, an eNB can take appropriate control action, for example order one or more of the devices to perform a handover to a frequency that has not been reported as suffering from in-device coexistence interference. In certain embodiments, in order to minimise the amount of reporting, only new IDC information is sent by the user equipment. Thus, a new IDC information is sent by the user equipment only if the content of IDC information changes compared to what has been reported in the previous occurrence of IDC information.

When the activation status of a serving cell changes the mobile device may have to report updated IDC information to the network. In some of the embodiments IDC information is reported, stored and used in control of the mobile devices depending on whether there is a change in the information compared to what has been previously reported for similar change in activation status.

Figure 5:
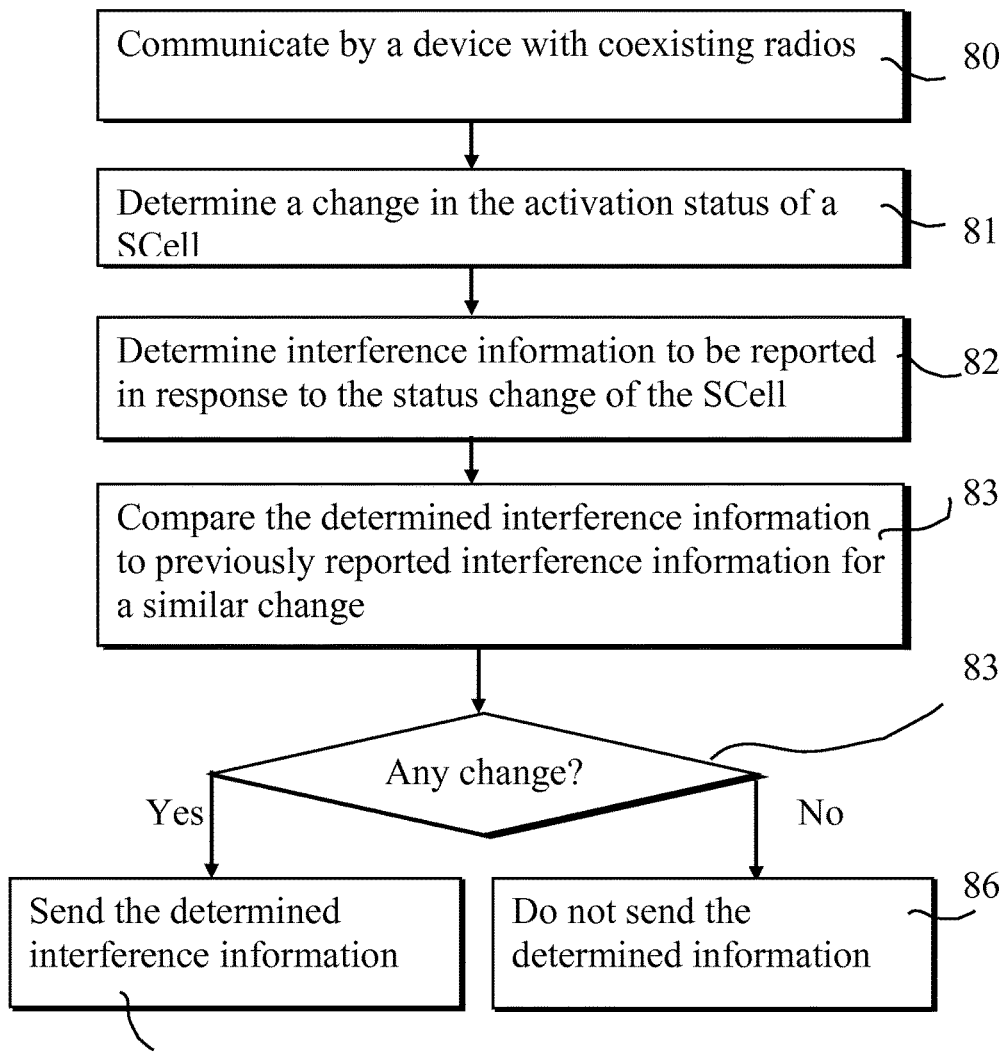
FIGS. 5 to 7 are flowcharts illustrating certain embodiments.

FIG. 5 is a flowchart in accordance with an embodiment for operation of a device with coexisting radios and capable of carrier aggregation that communicated with at least cell at 80. It is determined at 81 that there is a change in the activation status of a secondary cell. The device can then determine at 82 interference information, for example IDC information, to be reported in response to the determined change in the state of the secondary cell. The determined interference information to be reported is compared at 83 to interference information that has been reported previously for a similar change is the activation status of the secondary cell. Based on determination at 84 whether there is a change between the two sets of interference information, it is decided either to send the determined IDC information based on the determination, see 85, or refrain from sending the determined interference information, see 86. For example, at SCell activation, a new IDC information is reported only if the content of the report would be new compared to the last time IDC information was sent when that SCell was activated. Similarly, at SCell deactivation, a new IDC information is reported only if the content of the report would be new compared to the last time IDC information was sent when that SCell was deactivated.

Figure 6:
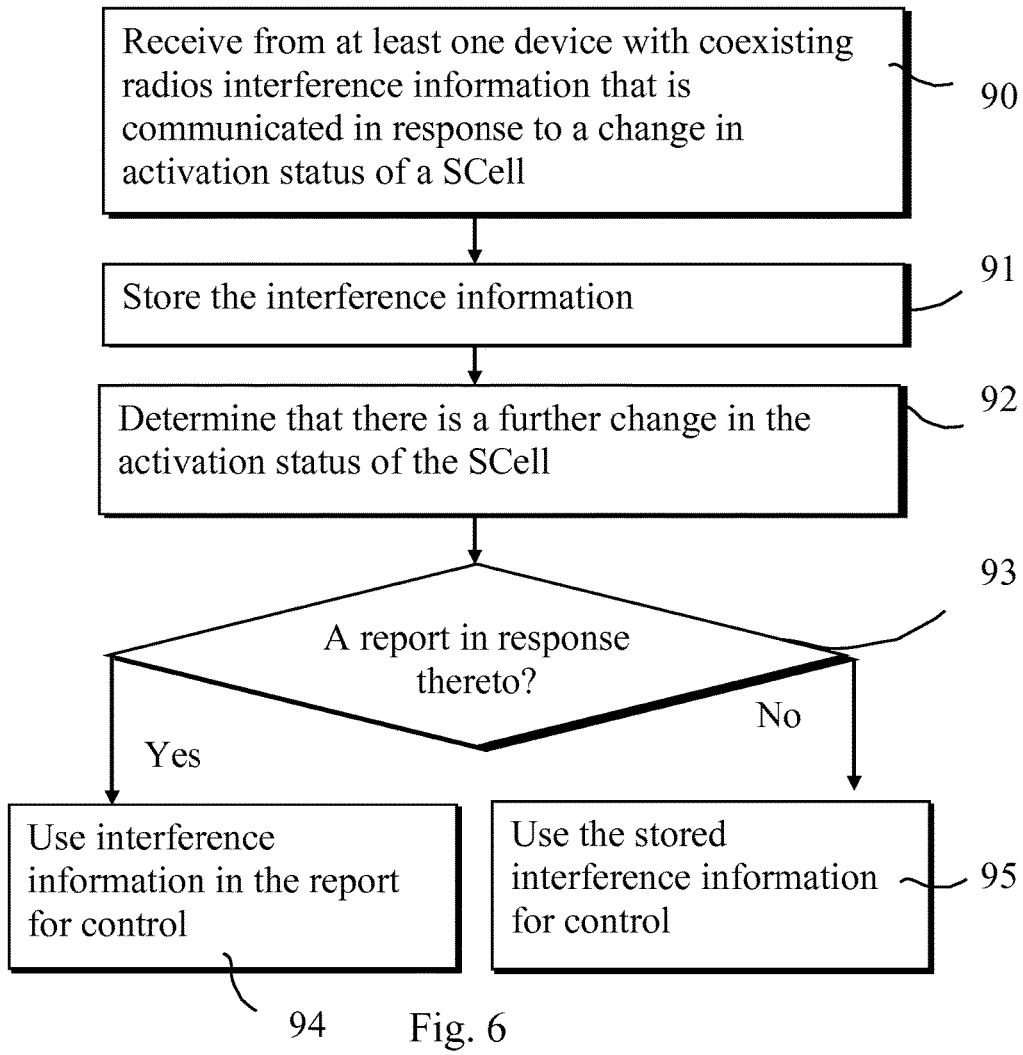

FIG. 6 shows operation at a network entity receiving at 90 the information for use in control of at least one device with coexisting radios and capable of carrier aggregation. Interference information determined by and received from at least one device is stored at 91. A new change in the activation status of a secondary cell for at least one device is ordered at 92. It can then be determined at 93, in response to the change in the status, whether interference information has been reported by the at least one device in response to the new change in the activation status of the secondary cell. The interference information received earlier and stored at 91 for a similar activation status change is then used in the control when it is determined that no interference information is received subsequent to the new change in the activation status of the secondary cell, as shown by 95. If a report is received, then information contained in the report is used, as shown by 94.

Figure 7:
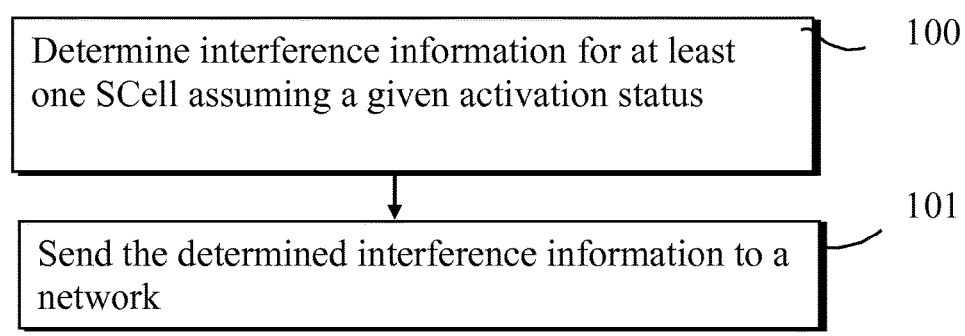

FIG. 7 shows operation in a device with coexisting radios and capable of carrier aggregation in accordance with another embodiment. In the method, when interference information, for example IDC information, is determined, a predefined or given activation the activation status is assumed for at least one available secondary cell, regardless what the status is in reality. In accordance with a possibility, all secondary cells of a set of configured cells for a device are considered to be in activated state at 100. This does not necessarily mean that the activation will take or has taken place, but only the effect of a possible activation of all cells is always taken into account. In other words, the reporting of interference information at 101 always considers any SCell belonging to the set of serving cells as being activated.

Alternatively, when IDC information is determined, the activation status of the secondary cells of the set of configured cells can always be considered as de-activated. The determined IDC information is then oblivious to possible changes activation status of SCells.

Since only new IDC information is reported, it follows that changes in the activation status of an SCell alone cannot change the content of IDC information and therefore this does not trigger sending of IDC information.

The serving eNB can be made aware whether the received information considers all SCells as activated, or deactivated, as the case may be, and can thus provide the control accordingly, without receiving IDC information reports for each status change.

The interference information can comprise in-device coexistence (IDC) interference information. The mobile device can be configured to have further restrictions in its triggering mechanisms of sending of an IDC information report. The mobile device detects that there is a change in the activation status and in response sends the IDC report. The mobile device report new IDC information at SCell activation or deactivation only if the content of the report is new compared to the last time IDC information was sent, e.g. the last time when that SCell was activated or deactivated in such a manner that the information changed. This in its part enables combined use of IDC and carrier aggregation CA in resolving the potential increase in overhead that is possible because an activation/deactivation changes the configuration of the user equipment receiver resulting in a situation where, every time an activation/deactivation command is given, an updated IDC information would be sent by the user equipment. This can translate into substantial overhead since the user equipment is likely to toggle between two reports: one when an SCell is activated and another when an SCell is deactivated. By determining IDC information reporting such that activation/deactivation does not necessarily always trigger an IDC information update from the user equipment can be used to resolve this issue, and the embodiments can be used to decrease potential uplink overhead.

The eNB is configured to maintain a record what information was reported to it the last time the relevant SCell was activated/deactivated.

Thus, when IDC information changes at SCell activation/deactivation, only new/changed information is reported to the eNB. By keeping a record in a memory thereof regarding information that was reported the last time when relevant SCells were activated/deactivated, the eNB knows what to expect whenever it activates an SCell.

According to another embodiment reporting of IDC information can be modified to take into account the possibility of activation of all SCells belonging to a configured set of serving cells. When all SCells are always considered as activated when reporting is made, it may not be necessary to communicate IDC information from the user equipment each time, if at all, after activation/deactivation. This kind of operation may be desired e.g. to guarantee that whenever an SCell is activated, the IDC information remains valid because the reporting always considers all SCells as activated. This embodiment may not as such allow for differentiating between activated and deactivated states but on the other hand can provide stable operation.

The various embodiment above can be provided as alternatives or as complementary solutions.

The required data processing apparatus and functions of a base station apparatus, a communication device and any other appropriate station or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on the LTE systems and 3GPP based systems, similar principles can be applied to other communication systems and channels where in-device interference may occur. For example, this may be the case in applications where no fixed station equipment is provided but a communication system is provided by means of a plurality of user equipment, for example in adhoc networks. Instead of the secondary cell being provided by at least one remote radio head or the like, the secondary cell may also be provided by at least one other base station apparatus such as an eNB. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method, comprising
performing operations for a device with coexisting radios, wherein for carrier aggregation one radio connects to a primary cell and another radio connects to a secondary cell, the operations comprising:
determining a change in the activation status of the secondary cell,
determining interference information to be reported in response to the determined change in the activation status of the secondary cell, wherein the interference information comprises in-device coexistence interference information,
comparing the determined interference information to be reported to interference information reported previously for a similar change in the activation status of the secondary cell,
deciding whether to send the determined interference information based on the comparison, and
deciding to send and sending the determined interference information in response to the change in the activation status only when there is different information content to be reported compared to previous reporting for a similar change, wherein the determined interference information is for use by the network element for control of the device for carrier aggregation.

2. A method as claimed in claim 1, wherein the change in activation status comprises activation or deactivation of the secondary cell.

3. A method as claimed in claim 1, wherein the device communicates via at least one of a long-term evolution of the Universal Mobile Telecommunications System radio, an Industrial, Scientific and Medical radio, a local wireless access radio, short range link radio, a satellite system radio, and a positioning system radio.

4. A method, comprising
performing operations in a network entity for control for carrier aggregation of at least one device with coexisting radios, wherein for carrier aggregation one radio of the at least one device connects to a primary cell corresponding to the network entity and another radio of the at least one device connects to a secondary cell, the operations comprising
storing interference information received from the at least one device in response to a changed activation status of a secondary cell, wherein the interference information comprises in-device coexistence interference information,
determining, after the storing, a new change in the activation status of the secondary cell,
determining whether new interference information is received in response to the new change in the activation status of the secondary cell, and
using the stored interference information in the control of the at least one device for carrier aggregation in response to a determination that no new interference information is received subsequent to the new change in the activation status of the secondary cell, and wherein interference information is reported in response to the change in the activation status only when there is different information content to be reported compared to previous reporting for similar change.

5. A method as claimed in claim 4, wherein the change in activation status comprises activation or deactivation of the secondary cell.

6. A method as claimed in claim 4, wherein the at least one device communicates via at least one of a long-term evolution of the Universal Mobile Telecommunications System radio, an Industrial, Scientific and Medical radio, a local wireless access radio, short range link radio, a satellite system radio, and a positioning system radio.

7. An apparatus comprising at least one processor, and at least one memory including computer program code, wherein the at least one memory and the computer program code are configured, with the at least one processor, to
perform operations for a device with coexisting radios, wherein for carrier aggregation one radio connects to a primary cell and another radio connects to a secondary cell, the operations comprising:
determine a change in the activation status of the secondary cell,
determine interference information to be reported in response to the determined change in the activation status of the secondary cell, wherein the interference information comprises in-device coexistence interference information,
compare the determined interference information to be reported to interference information reported previously for a similar change in the activation status of the secondary cell,
decide whether to send the determined interference information based on the comparison, and
decide to send and send the determined interference information in response to the change in the activation status only when there is different information content to be reported compared to previous reporting for a similar change, wherein the determined interference information is for use by the network element for control of the device for carrier aggregation.

8. An apparatus as claimed in claim 7, wherein the change in activation status comprises activation or deactivation of the secondary cell.

9. An apparatus as claimed in claim 7, wherein the device is adapted to communicate via at least one of a long-term evolution of the Universal Mobile Telecommunications System radio, an Industrial, Scientific and Medical radio, a local wireless access radio, short range link radio, a satellite system radio, and a positioning system radio.

10. A user equipment comprising an apparatus as claimed in claim 7.

11. An apparatus comprising at least one processor, and at least one memory including computer program code, wherein the at least one memory and the computer program code are configured, with the at least one processor, to
perform operations in a network entity for control for carrier aggregation of at least one device with coexisting radios, wherein for carrier aggregation one radio of the at least one device connects to a primary cell and another radio of the at least one device connects to a secondary cell, the operations comprising
store interference information received from the at least one device in response to a change in the activation status of a secondary cell, wherein the interference information comprises in-device coexistence interference information,
determine, after the storing, a new change in the activation status of the secondary cell,
determine whether new interference information is reported in response to the new change in the activation status of the secondary cell, and
use the stored interference information in the control of the at least one device for carrier aggregation in response to a determination that no new interference information is received subsequent to the new change in the activation status of the secondary cell, and wherein interference information is reported in response to the change in the activation status only when there is different information content to be reported compared to previous reporting for similar change.

12. A base station comprising an apparatus according claim 11.

13. A base station as claimed in claim 12, comprising an evolved Node B.

14. A computer program product comprising a non-transitory computer medium comprising program code adapted to cause a data processing apparatus to perform the method of claim 1 when the program is run on the data processing apparatus.

15. A computer program product comprising a non-transitory computer medium comprising program code adapted to cause a data processing apparatus to perform the method of claim 4 when the program is run on the data processing apparatus.

* * * * *